(12) United States Patent
Korpach

(10) Patent No.: US 11,844,991 B2
(45) Date of Patent: Dec. 19, 2023

(54) GOLF SYSTEM

(71) Applicant: ANK PARTNERS INC., Calgary (CA)

(72) Inventor: Arthur Neil Korpach, Calgary (CA)

(73) Assignee: ANK PARTNERS INC., Calgary (CA)

( * ) Notice: Subject to any disclaimer, the term of this patent is extended or adjusted under 35 U.S.C. 154(b) by 260 days.

(21) Appl. No.: 17/238,862

(22) Filed: Apr. 23, 2021

(65) Prior Publication Data

US 2021/0236904 A1 Aug. 5, 2021

Related U.S. Application Data

(62) Division of application No. 15/949,257, filed on Apr. 10, 2018, now Pat. No. 11,013,976.

(Continued)

(51) Int. Cl.
*A63B 69/36* (2006.01)
*G09B 19/00* (2006.01)
(Continued)

(52) U.S. Cl.
CPC ...... *A63B 69/3691* (2013.01); *A63B 69/3658* (2013.01); *A63F 13/245* (2014.09);
(Continued)

(58) Field of Classification Search
CPC .............. A63B 69/3691; A63B 69/3658; A63F 13/245; A63F 13/812; G09B 9/00; G09B 19/0038
See application file for complete search history.

(56) References Cited

U.S. PATENT DOCUMENTS

| 3,563,553 A | 2/1971 | Baldwin et al. |
| 5,395,115 A | 3/1995 | Ferns et al. |

(Continued)

FOREIGN PATENT DOCUMENTS

| CA | 2017424 A1 | 11/1990 |
| CA | 2118000 A1 | 11/1993 |

(Continued)

OTHER PUBLICATIONS

European Patent Office, Extended European Search Report dated Nov. 16, 2021 for European Application No. 21177733.9.

(Continued)

*Primary Examiner* — Yingchuan Zhang
(74) *Attorney, Agent, or Firm* — Norton Rose Fulbright Canada LLP

(57) ABSTRACT

A golf system includes a striking area; a target area including a plurality of physical targets positioned at different locations relative to the striking area; and at least one sensing device for sensing one or more parameters regarding the travel of a physical golf ball. A processor is configured to: access a database including golf hole data, the golf hole data defining relative positions of a tee-off location and a pin location for a virtual golf hole; based on the one or more parameters regarding the travel of the physical golf ball struck from the striking area, update a virtual location of a virtual golf ball on the virtual golf hole; and generate signals to provide an indication of which of the plurality of physical targets represents a direction of the pin location based on the virtual location of the virtual golf ball and the locations of the physical targets.

10 Claims, 12 Drawing Sheets

Related U.S. Application Data

(60) Provisional application No. 62/483,618, filed on Apr. 10, 2017.

(51) Int. Cl.
*A63F 13/812* (2014.01)
*A63F 13/245* (2014.01)
*G09B 9/00* (2006.01)
*A63B 102/32* (2015.01)

(52) U.S. Cl.
CPC .............. *A63F 13/812* (2014.09); *G09B 9/00* (2013.01); *G09B 19/0038* (2013.01); *A63B 2102/32* (2015.10); *A63B 2220/30* (2013.01); *A63B 2220/75* (2013.01); *A63B 2220/76* (2013.01)

(56) References Cited

U.S. PATENT DOCUMENTS

| | | | |
|---|---|---|---|
| 8,409,024 B2 | 4/2013 | Marty et al. | |
| 9,132,345 B2 | 9/2015 | Nicora et al. | |
| 9,616,311 B2 | 4/2017 | Nicora | |
| 9,984,587 B2 | 5/2018 | Shultz | |
| 10,058,758 B2 | 8/2018 | Coffman | |
| 10,086,249 B2 | 10/2018 | Nicora | |
| 10,137,351 B2 | 11/2018 | Coffman | |
| 10,195,511 B2 | 2/2019 | Dolige et al. | |
| 10,486,047 B2 | 11/2019 | Coffman | |
| 11,308,821 B2 | 4/2022 | Pregizer et al. | |
| 11,311,789 B2 | 4/2022 | DeLeon et al. | |
| 2002/0177490 A1 | 11/2002 | Yong et al. | |
| 2003/0040373 A1 | 2/2003 | Chamberlain et al. | |
| 2005/0227792 A1* | 10/2005 | McCreary | A63B 24/0021 473/409 |
| 2006/0105857 A1 | 5/2006 | Stark | |
| 2009/0036237 A1 | 2/2009 | Nipper et al. | |
| 2010/0144456 A1 | 6/2010 | Ahern | |
| 2012/0267855 A1 | 10/2012 | Choi | |
| 2014/0004967 A1 | 1/2014 | Jang et al. | |
| 2014/0155186 A1 | 6/2014 | Lee et al. | |
| 2015/0005084 A1 | 1/2015 | Tawwater et al. | |
| 2015/0080142 A1* | 3/2015 | Kline | A63B 37/0075 473/221 |
| 2016/0325171 A1 | 11/2016 | Niegowski | |
| 2018/0290040 A1 | 10/2018 | Korpach | |
| 2019/0255407 A1 | 8/2019 | Rivas | |
| 2019/0255418 A1 | 8/2019 | Seo | |

FOREIGN PATENT DOCUMENTS

| | | |
|---|---|---|
| CA | 2602978 A1 | 2/2009 |
| CA | 2785987 A1 | 7/2011 |
| CA | 2875756 A1 | 7/2011 |
| CA | 2830497 A1 | 9/2012 |
| CA | 2916462 A1 | 1/2015 |
| CA | 2959499 A1 | 3/2016 |
| CN | 201286964 Y | 8/2009 |
| KR | 101555840 B1 | 9/2015 |

OTHER PUBLICATIONS

Japanese Patent Office, Office Action dated Apr. 5, 2022 for Patent Application No. 2019-556224.
Korean Patent Office, Office Action dated Nov. 9, 2022 for Korean Application No. 10-2019-7033342.
EPO, European Search Report (partial supplementary) for Application No. 18784849.4 dated Jan. 11, 2021.
A. Umek et al.; "Suitability of Strain Gage Sensors for Integration into Smart Sport Equipment: A Golf Club Example"; Sensors, 2017, 17(4):916.
WIPO, Written Opinion and International Search Report for PCT Application No. PCT/CA2018/050437 dated Jul. 10, 2018.
EPO, Extended European Search Report for Application No. 18784849.4 dated Apr. 12, 2021.
China National Intellectual Property Administration, Office Action dated Feb. 11, 2023 for Application 201880024255.8.

* cited by examiner

GOLF SYSTEM

CROSS-REFERENCE TO RELATED APPLICATIONS

This application is a division of U.S. patent application Ser. No. 15/949,257, entitled "GOLF SYSTEM", filed on Apr. 10, 2018, which claims all benefit including priority to U.S. Provisional Patent Application No. 62/483,618, filed Apr. 10, 2017, and entitled "GOLF SYSTEM", the entirety of which is hereby incorporated by reference.

FIELD

Embodiments of the present disclosure relate generally to golf technologies, and particularly to golf systems and methods, devices and computer-readable media for a golf system.

INTRODUCTION

Traditional golf courses require large parcels of land, have high upkeep costs, and are often situated away from central locations. Course maintenance requires machinery and manual labour, and can consume large amounts of fuel, water, and chemicals.

The game of golf often involves a significant time and financial commitment. Green fees, equipment costs, travel times, waiting times, and the generally slower pace of a traditional game of golf can all be deterrents to uptake of the sport.

SUMMARY

In accordance with one aspect, there is provided: a golf system including: a striking area; a target area including a plurality of physical targets, the physical targets being positioned at different locations relative to the striking area; at least one sensing device for sensing one or more parameters regarding the travel of a physical golf ball struck from the striking area; and at least one processor configured to: access a database including golf hole data, the golf hole data defining relative positions of a tee-off location and a pin location for a virtual golf hole; based on the one or more parameters regarding the travel of the physical golf ball struck from the striking area, update a virtual location of a virtual golf ball on the virtual golf hole; and generate signals to provide an indication of which of the plurality of physical targets represents a direction of the pin location based on the virtual location of the virtual golf ball and the locations of the physical targets relative to the striking area.

In accordance with another aspect, there is provided a method for operating a golf facility including a plurality of physical targets in a target area, and a striking area from which golf balls are struck into the target area. The method includes: receiving, with at least one processor and from at least one sensing device, one or more parameters defining travel of a physical golf ball struck from the striking area; associating, by the at least one processor, the parameters defining the travel of the struck golf ball with a player profile, the player profile corresponding to ball location data defining a virtual location of a virtual golf ball on a virtual golf hole; based on the one or more parameters regarding the travel of the physical golf ball struck from the striking area and golf hole data defining relative positions of a tee-off location and a pin location for a virtual golf hole, updating the ball location data to define an updated virtual location of the virtual golf ball on the virtual golf hole; and based on golf facility data including data regarding positions of the plurality of physical targets in the target area of the golf facility relative to the striking area of the golf facility, generating signals to provide an indication of a particular physical target of the plurality of physical targets provides information regarding a direction of the pin location based on the updated virtual location of the virtual golf ball and the locations of the physical targets relative to the striking area.

In accordance with another aspect, there is provided a non-transitory, computer-readable medium or media having stored thereon computer-readable instructions which when executed, configure at least one processor for: receiving, from at least one sensing device, one or more parameters defining travel of a physical golf ball struck from a striking area of a golf facility, the striking area from which golf balls are struck into a target area including a plurality of physical targets; associating the parameters defining the travel of the struck golf ball with a player profile, the player profile corresponding to ball location data defining a virtual location of a virtual golf ball on a virtual golf hole; based on the one or more parameters regarding the travel of the physical golf ball struck from the striking area and golf hole data defining relative positions of a tee-off location and a pin location for a virtual golf hole, updating the ball location data to define an updated virtual location of the virtual golf ball on the virtual golf hole; and based on golf facility data including data regarding positions of the plurality of physical targets in the target area of the golf facility relative to the striking area of the golf facility, generating signals to provide an indication of a particular physical target of the plurality of physical targets provides information regarding a direction of the pin location based on the updated virtual location of the virtual golf ball and the locations of the physical targets relative to the striking area.

DESCRIPTION OF THE FIGURES

Reference will now be made to the drawings, which show by way of example embodiments of the present disclosure.

DESCRIPTION OF EXAMPLE EMBODIMENTS

In some embodiments, aspects of the present application may provide infrastructure, and technical systems and methods underlying a modified golf game.

Some approaches to a modified golf game involve indoor tee mats and screens displaying the virtual flight path of a ball. Some of these approaches lose some of the game's best features including: spending time outdoors, group camaraderie and competition, and the visual confirmation and associated satisfaction of a shot outcome, and the real effects of weather and golf ball lies on shot outcomes.

Figure 1:
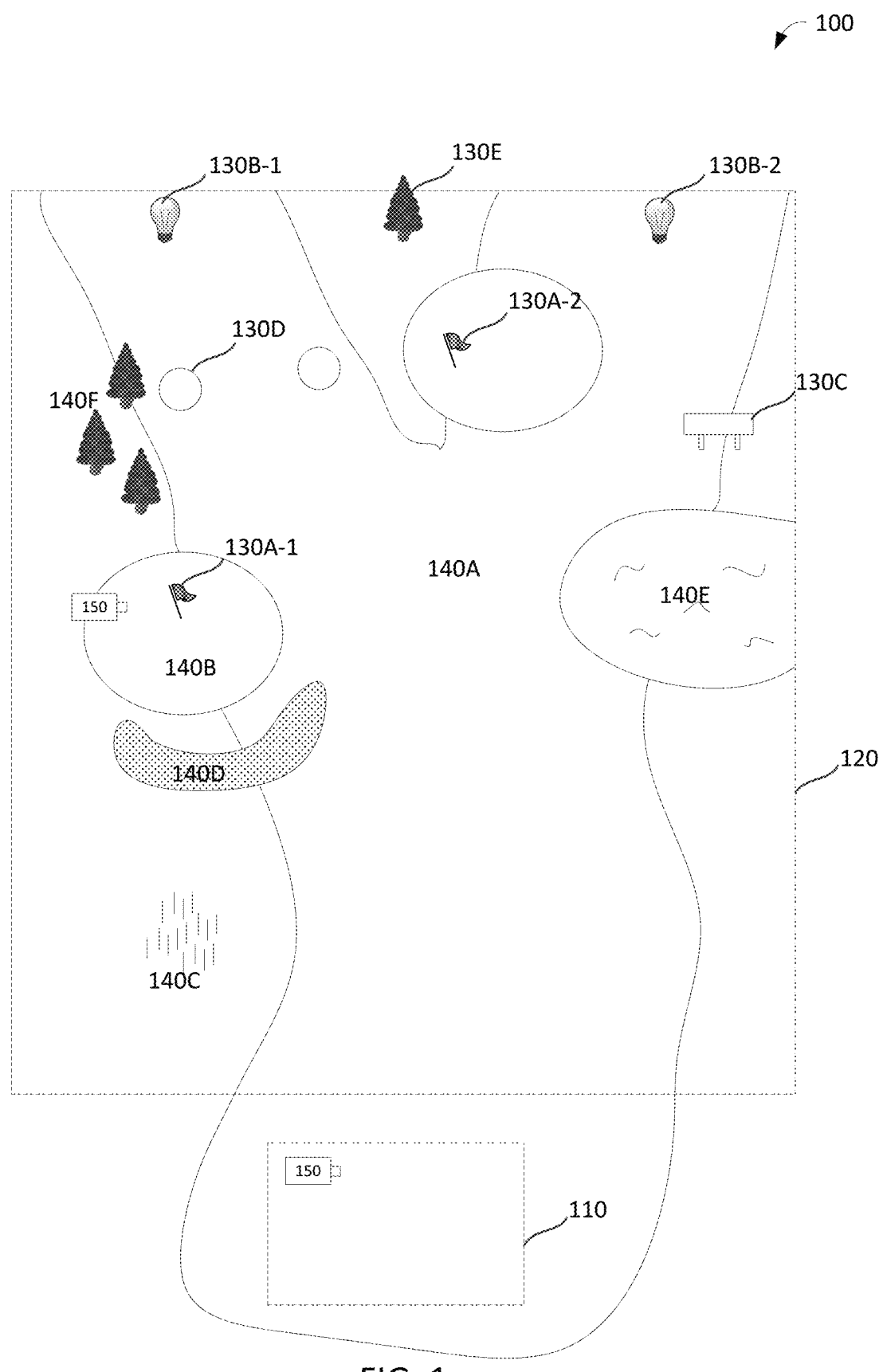
FIGS. 1, 2A, and 2B show aspects of example golf systems.

FIG. 1 is an overhead view showing aspects of an example golf system or facility 100. The golf system 100 includes one or more striking areas 110 and one or more target areas 120. A striking area 110 can be any delineated or otherwise designated area from which a player hits a golf ball into or otherwise towards a target area 120.

In some embodiments, a striking area 110 can be a separate area such as a tee box, or may appear to be part of a golf hole as illustrated for example, in FIG. 1.

A target area 120 can include one or more physical targets 130. In some embodiments, physical targets 130 can include flags 130A-1, 130A-2, lights 130B-1, 130B-2, signs 130C, yardage markers 130D, natural landmarks 130E, or any other object which can serve as a target for a player in the striking area 110.

The physical targets 130 are positioned at different locations relative to the striking area 110. In some embodiments, the system 100 includes one or more memory devices for storing data defining the locations of the physical targets 130 relative to the striking area 110. For example, data defining the relative locations of the physical targets 130 can include distances, angles, and/or elevations from the striking area 110.

In some embodiments, a target area 120 is designed to include features 140 of a golf hole on a traditional golf course. For example, a target area 120 can include fairways 140A, greens 140B, rough 140C, sand traps 140D, water 140E, trees 140F, inclines, different elevations, and the like. In some embodiments, the memory devices store data defining the locations of the golf features 140 in the target area 120 relative to the striking area 110.

In some embodiments, the target area 120 can include features of more than one golf hole. For example, the target area 120 may include multiple greens, holes, fairways, etc.

Figure 2A:
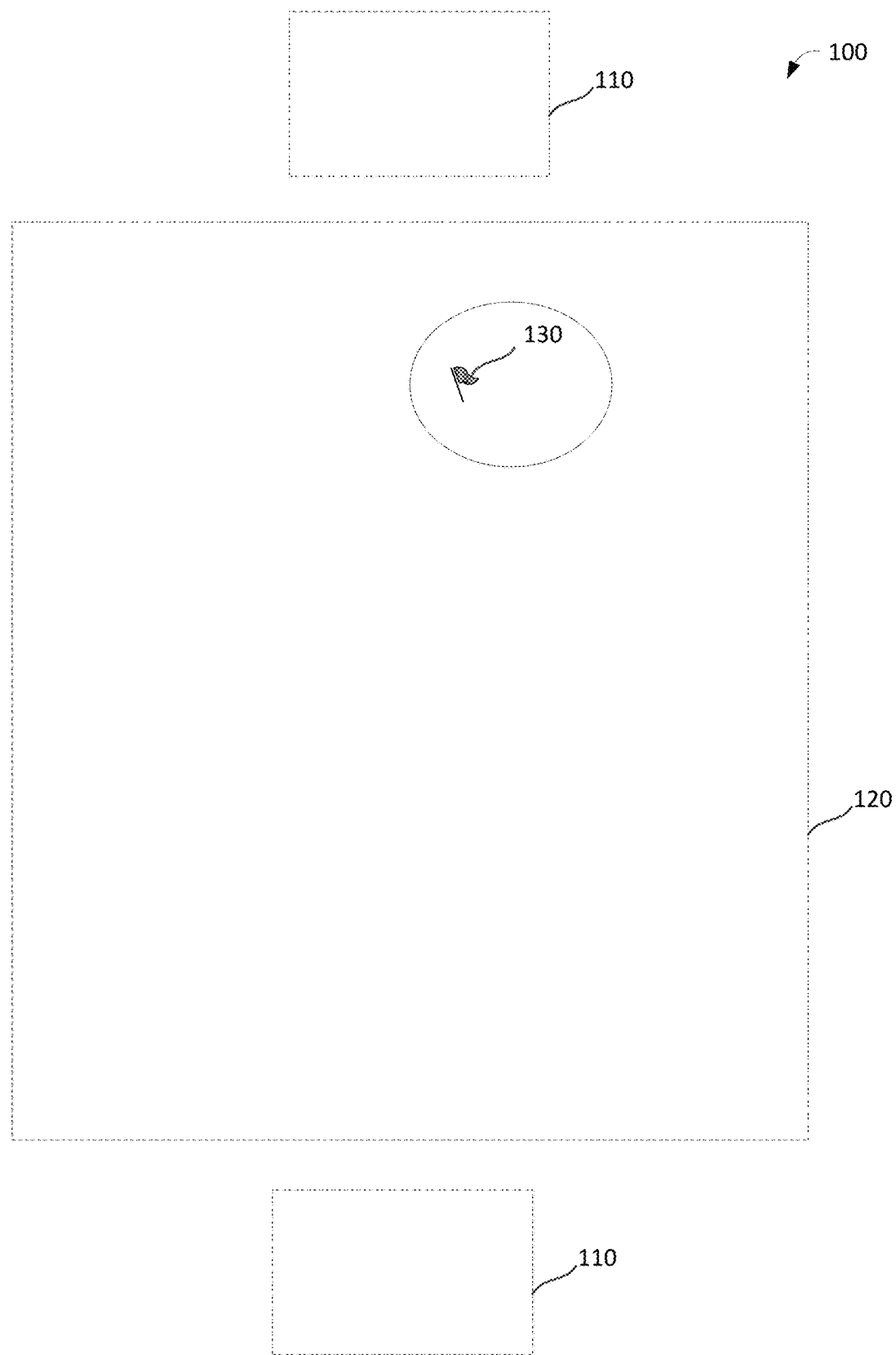
Figure 2B:
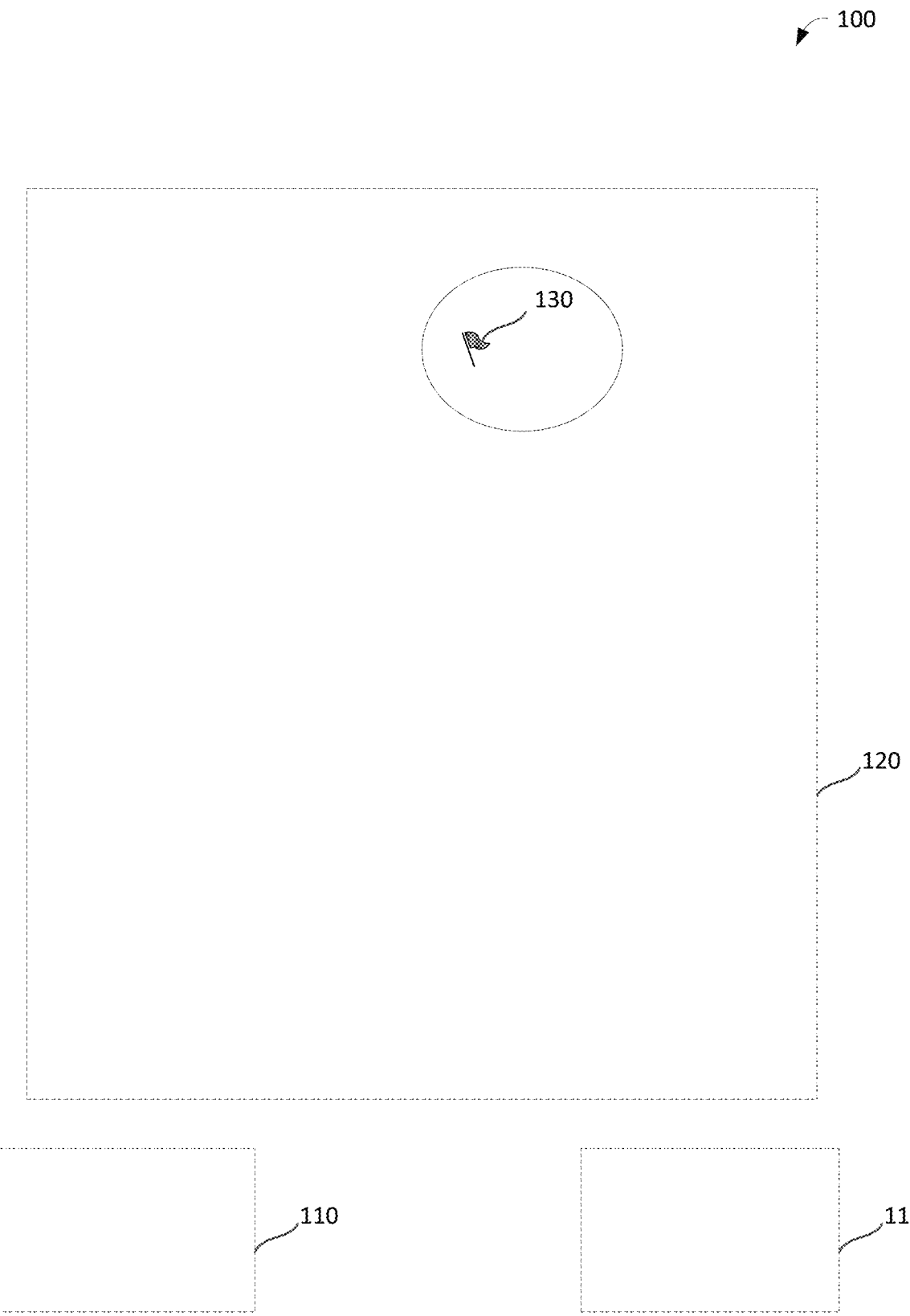

As illustrated in FIGS. 2A and 2B, in some embodiments, one target area 120 can be associated with multiple striking areas 110. The striking areas 110 can be positioned at different locations relative to the target area 120. In some embodiments, memory devices can store golf facility data defining the locations of physical targets 130 in the target area 120 relative to each striking area 110.

In some embodiments, the system 100 includes one or more sensing devices 150 for sensing one or more parameters regarding the travel of a physical golf ball struck from the striking area 110. In some embodiments, sensing devices 150 can include cameras, radars, or the like for sensing data regarding ball speed, spin, trajectory, horizontal and/or vertical angle of ball path, etc. In some embodiments, the sensing devices can sense parameters at multiple times during a ball's travel. In some embodiments, sensing devices 150 may sense data regarding a club's motion or position such as swing speed, club trajectory, club face angle upon impact with the ball, etc.

In some embodiments, sensing devices 150 can include devices which sense wind direction and speeds, humidity, precipitation, and/or other weather characteristics as additional parameters affecting (regarding) the travel of a ball. In some embodiments, these weather-related parameters are included in calculations for determining how far a ball has travelled.

In some embodiments, one or more sensing devices 150 can sense data for balls being struck from multiple striking areas 110.

In some embodiments, sensing devices 150 and/or other aspects of the system can include technologies provided by Toptracer™, Protracer™, Trackman™ and/or other suitable technologies.

In some embodiments, sensing devices 150 may be positioned in or proximate to the striking area 110, and/or in or proximate to the target area 120. For example, in some embodiments, sensing devices 150 may be positioned in or proximate to the golf features 140 in the target area 120 such as cameras to confirm a ball has landed in a bunker 140D, in the water 140E or on a green 140B.

In some embodiments, sensing device 150 may include location tracking devices. For example, in some embodiments, the system may include GPS devices in balls which provide sensed data as to the location of the ball after it is struck.

The system 100 includes one or more processors configured to provide signals for a modified golf game. The processor(s) may be part of one or more servers, computers, mobile devices and the like. In some embodiments, the operations performed by the processor(s) may be performed by one or more processors on a single electronic device, or by processors spread across multiple devices.

In some embodiments, the processors are configured to access golf hole data from one or more data storage devices. The golf hole data may be stored in a database or any other data format. In some embodiments, the golf hole data defines relative positions of a tee-off location(s) and a pin location for a virtual golf hole.

For example, in some embodiments, the golf hole data may include Cartesian or radial coordinates or any other data for defining relative locations of the virtual golf hole and the tee-off location(s). In some embodiments, the golf hole data may include elevation values.

In some embodiments, the golf hole data may include data which defines the location of features of the golf hole such as the location of the green, the location of a bunker, the location of a water hazard, etc.

In some embodiments, the golf hole data may include data which defines the perimeter of or otherwise defines the area covered by a particular feature such as a tee-off area, a golf hole, a green, fairway, bunker, water hazard, etc.

In operation, the processor(s) are configured to track and update the virtual location of player's ball on the golf hole. When a player is starting a hole, the processor(s) set the virtual location of the player's ball to a tee-off location.

Based on the current virtual location of the player's ball, the processor(s) generate signals to provide an indication of which of the plurality of physical targets represents a direction and/or distance of the pin location from the striking area 110.

For example, for a tee shot on a par 4 or par 5 hole, the processors may generate signals indicating that the direction of the hole is in the direction of light bulb 130B-2. This would be the case, for example, if the hole has a dogleg right.

For a different hole having a different virtual layout, based on the location of the virtual pin relative to the striking area 110, the processors may generate signals indicating that the direction of the hole is in the direction of yardage markers 130D (e.g. for a hole with a dogleg left), or that the direction of the hole is in the direction of tree 130E (e.g. for a hole that is generally straight).

In some embodiments, the signals may provide an indication of a target relative to two or more physical targets. For example, an indication may indicate that direction of the pin is between light 130B-1 and tree 130E.

In some instances, based on the player's virtual ball location relative to the hole's virtual pin location and on the location of the striking area 110 relative to the flag locations 130A-1 or 130A-2, the processors may generate signals indicating that the hole is at one of the flags 130A-1 or 130A-2. The physical flags or other targets indicated by the processors can provide a player with a real-life visual of the direction and distance of a hole.

In some embodiments, the generated signals providing the indication of which physical target represents the direction and/or distance of the pin includes generating instructions for displaying the indication on a display at or proximate to the striking area 110. For example, a display device may be positioned in or proximate to the striking area 110 and upon receiving the signals from the processor(s), may display text, images and/or any other indication of the physical target that the player is to target. For example, in some embodiments, the display may display text indicating the hole is in the direction of light 130B-1. In some embodiments, the display may alternatively or additionally display an image of the target such as light 130B-1 (alone or in its environment).

In some embodiments, targets can be identified by numbers or other symbols (e.g. tree #50, triangle fairway, flag #25, square sign #18). These identifiers can be presented in the target area as signs positioned at the target, or written/drawn directly on the target such that they are visible to the players at the relevant striking areas.

In some embodiments, the display may be on a device at each striking area 110. Additionally or alternatively, in some embodiments, the display may be on a mobile device associated with the player or one of the players in a group.

In some embodiments, the signals providing the indication of the target may turn on lights or otherwise control devices to illuminate or highlight the physical targets 130 in the target area 120.

In some embodiments, the signals providing the indication may cause an audio device to provide audio indications of the physical target.

In some embodiments, the processors may generate signals indicating whether a hazard is in play based on the virtual location of the player's ball, the golf hole data and the physical location of the golf feature in the target area 120. For example, if the processors determine that the golf hole data indicates that the current hole does not have a water hazard, the processors can generate signals to provide an indication that the player can disregard the physical water hazard 140E. Accordingly, if the player hits the ball into the water, the player will not be penalized.

When a player strikes a physical golf ball from the striking area 110, the processors receive data from the sensing device(s) 150 indicating one or more parameters regarding the travel of the physical golf ball. In some embodiments, based on these parameters, the processors determine a new virtual location of the player's golf ball on the virtual hole. For example, if the sensed data indicates that the player hit the physical golf ball 250 yards five degrees left of center, the processor(s) are configured to update the location value of the player's virtual ball accordingly.

When it is the player's turn again, the processors are configured to generate an indication of which of the physical targets represents a direction and/or distance of the pin based on the updated location of the player's virtual ball.

In some embodiments, based on the sensed data, the processors may identify a lie of the player's virtual ball. For example, based on the golf hole data and the updated location of the player's virtual ball, the processors may determine that the player's ball is in a bunker, is in the rough, is in the water, is on an incline, is on the fairway, is to be teed off, etc.

In some embodiments, the lie and/or location of the ball may trigger penalty strokes and/or the processors may generate signals indicating the player should hit another ball.

In some embodiments, the striking area 110 includes portions having physical ground features corresponding to different lies. For example, the striking area 110 may have a fairway portion with short grass, a bunker portion with sand, a rough portion with long grass, a tee box, and/or any other lie. In some embodiments, the processors may generate signals to provide an indication of a portion of the striking area 110 from which a player is to hit the ball based on the lie of the player's virtual ball.

In some embodiments, the processors may adjust the virtual location of the player's ball based on the lie. For example, a ball in the rough may increase the relative distance to the hole by 10-40 yards.

Figure 3:
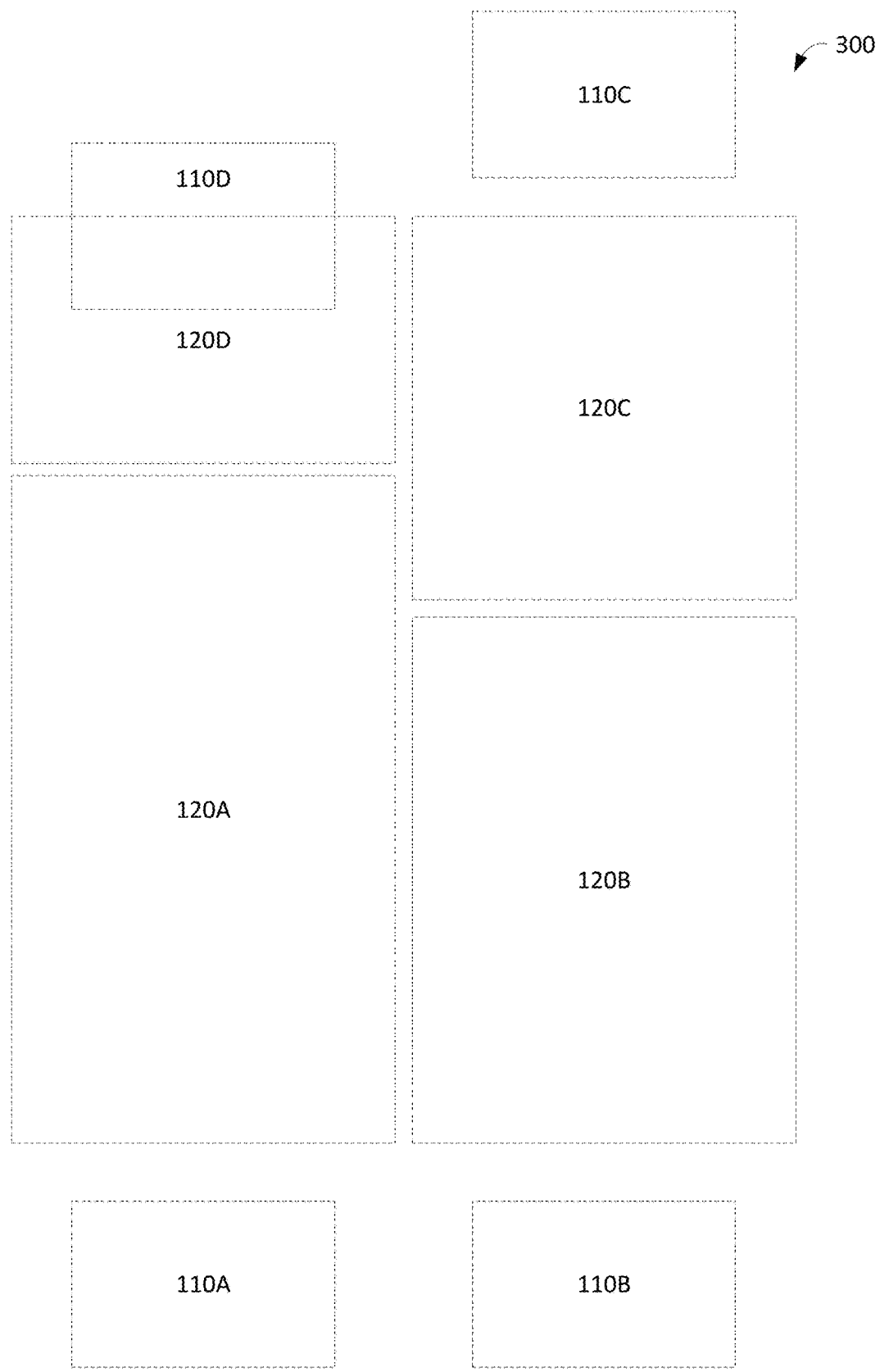
FIGS. 3, 4 and 5 show aspects of example golf systems including multiple target areas.
Figure 4:
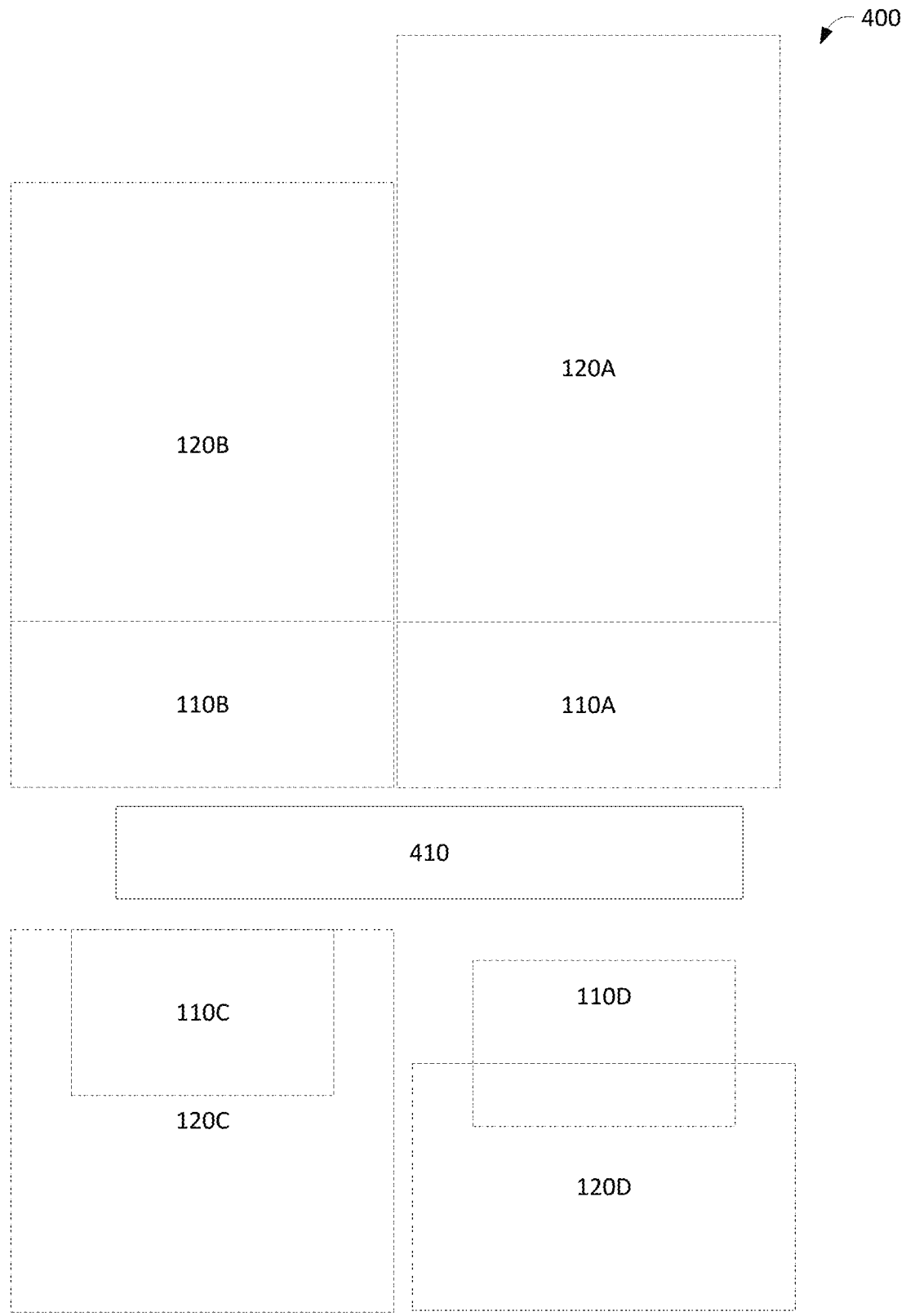

In some embodiments, the system 100 may have multiple target areas 120 or the target area may have different zones. FIG. 3 shows an example system 300 having four target areas 120A, 120B, 120C, 120D. While FIG. 3 shows a particular arrangement of target areas with a relatively efficient use of space, other arrangements are possible. In other embodiments, different striking areas can share at least a portion of the same target area.

In this example embodiment, the system 300 has a long target area 120A. This target area 120A and corresponding striking area 110A would be used for drives or subsequent shots with large distances from the hole. In some embodiments, a long target area 120A may have physical targets and features corresponding to the early parts of long holes such as roughs, different fairway widths, fairway bunkers, water hazards, etc. In some examples, a long target area 120A may be 350-400 yards long.

Figure 6:
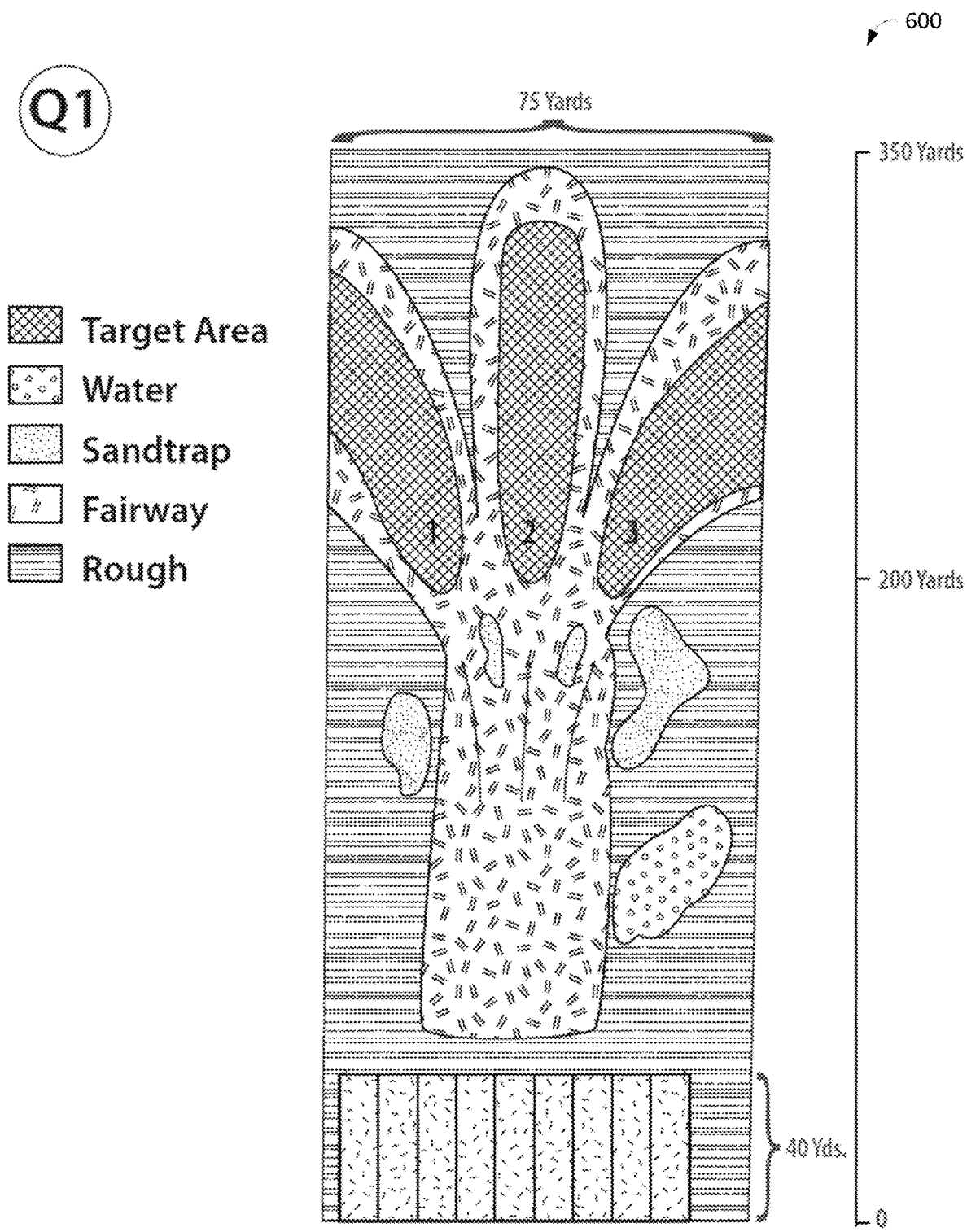
FIG. 6 shows aspects of example striking and target areas for tee shots.

FIG. 6 shows aspects of a system 600 having a long target area.

In some embodiments, the system 300 includes an approach shot target area 120B. In some examples, an approach shot target area 120B can include a series of greens (and optionally bunkers, water, etc.) at different distances (e.g. every 40 yards) and/or directions. In some examples, the greens may have different physical pin targets. In some examples, an approach shot target area 120B may be 300 yards long.

Figure 7:
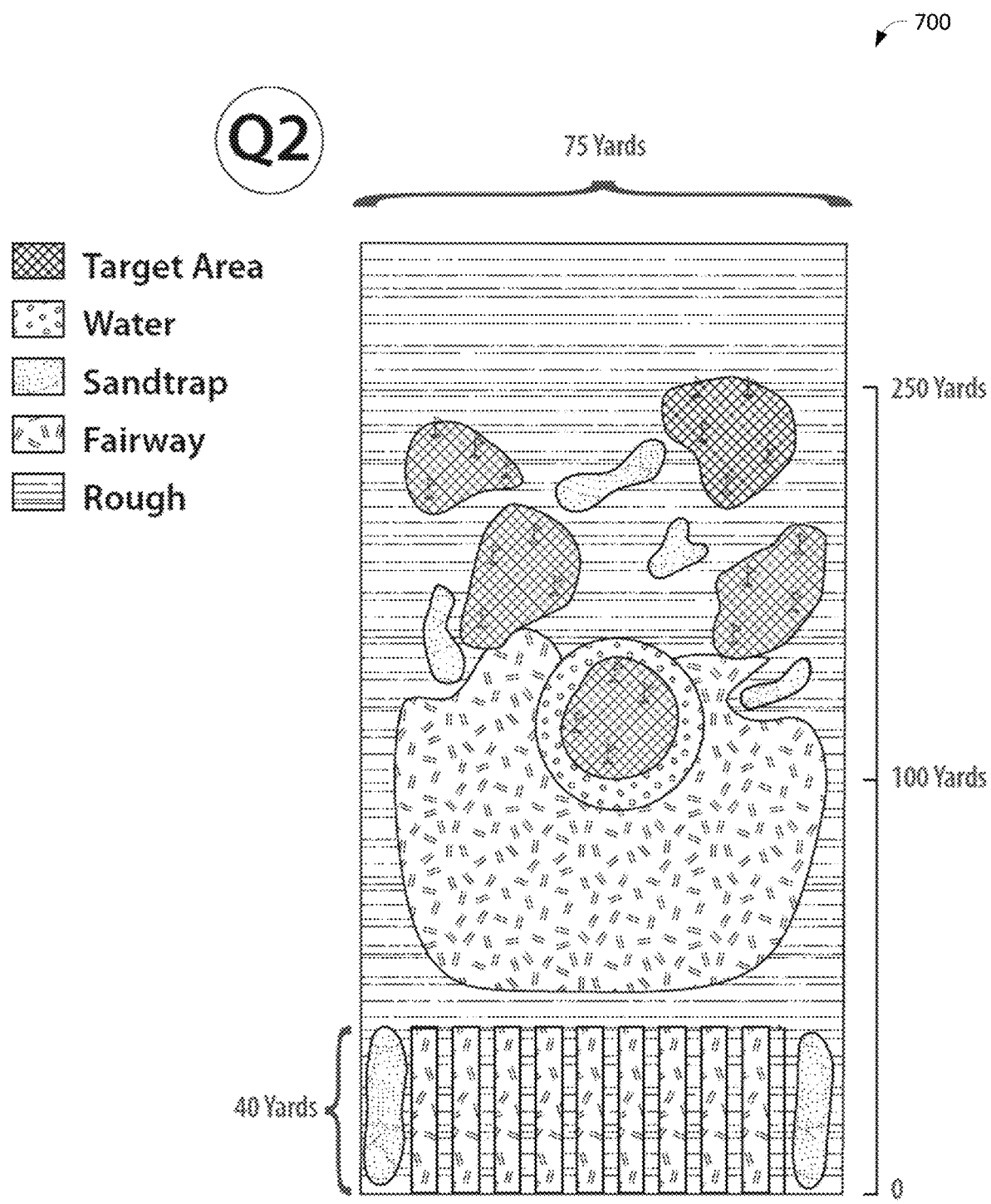
FIG. 7 shows aspects of example striking and target areas for approach shots.

FIG. 7 shows aspects of a system 700 having an approach shot target area.

Figure 8:
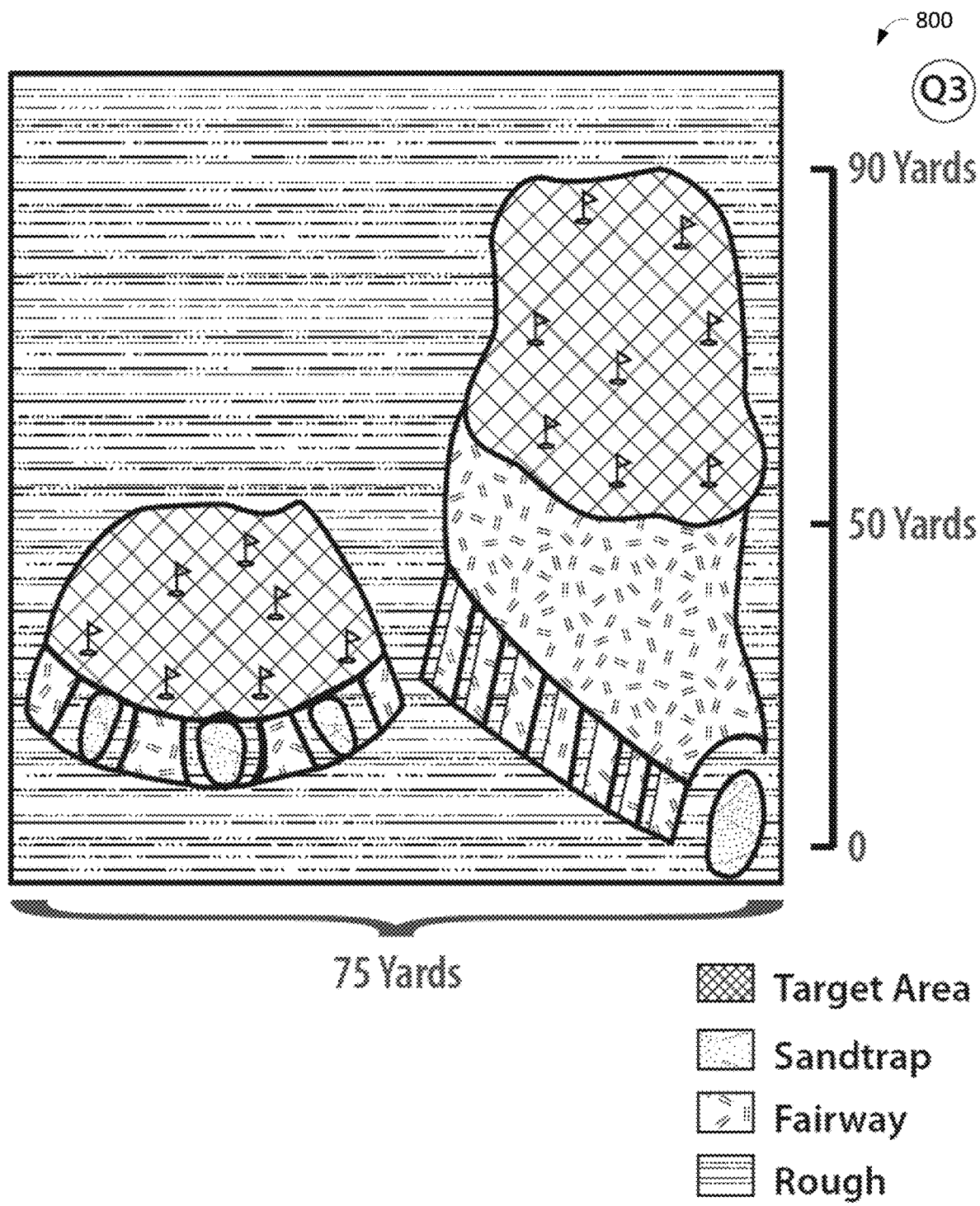
FIG. 8 shows aspects of example striking and target areas for chip/pitch shots.
Figure 9:
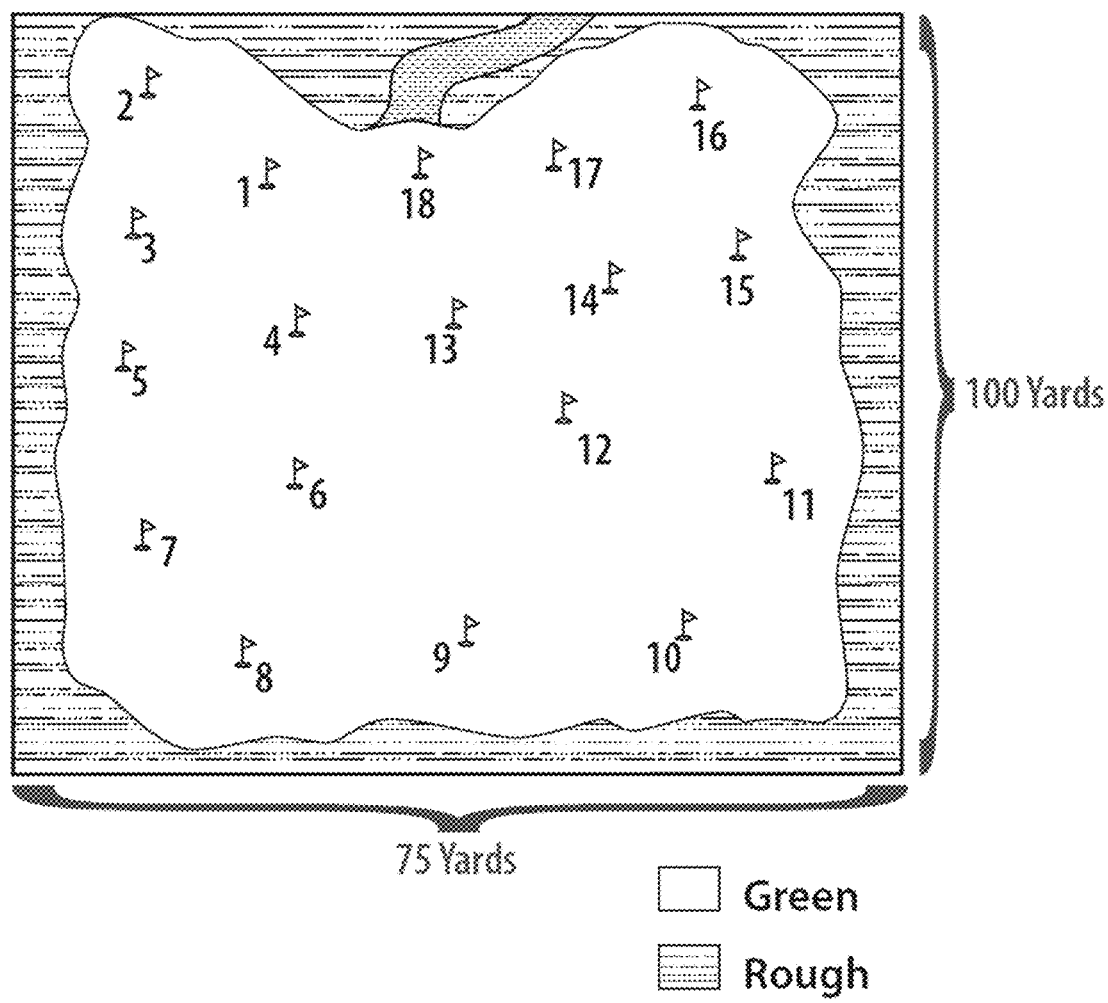
FIG. 9 shows aspects of example striking and target areas for putting.

In some embodiments, the system 300 includes a pitching/chipping target area 120C, and/or a putting target area 120D. FIG. 8 shows aspects of a system 800 having a pitching/chipping target area. FIG. 9 shows aspects of a system 900 having a putting target area.

In some embodiments, a green in a target area such as the pitching/chipping target area 120C may have a number of physical markers to provide an indication of where a player should putt from on a green in a putting target area 120D. As illustrated in FIG. 3, in some embodiments, the putting target area 120D may overlap with or may be considered a putting striking area 110D.

In some embodiments, the putting area 110D/120D may include a one or more labelled markers identifying putting locations, and one or more labelled holes identifying physical targets. In some embodiments, the processors generate signals providing an indication of both the putting location that a player is the putt from, and the hole which the player is targeting. In some embodiments, a labelled hole can also provide an indication of a putting location. In some embodiments, the striking location (i.e. the putting location that the player is to putt from) and the physical target are selected by the processors based on a distance and undulation/slope of the path between the striking location and physical target which matches the distance and undulation/slope of the path between the virtual ball location and the virtual hole.

In some embodiments, the processors are configured to generate signals for communicating when a player or group is to move to a different striking area for their next shot(s) based on the locations of the player(s) virtual balls.

In some instances, embodiments of the present disclosure may allow multiple players and/or groups to play concurrently at different striking areas. In some instances, a round of golf played with embodiments of the system may be faster than a traditional round of golf, and/or may provide for greater throughput of players/groups.

In some embodiments, the amount of land and the corresponding cost to build and maintain a golf system as described for example herein may be significantly less than a traditional golf course. For example. A 4-quadrant golf system can, in some instances, utilize one tenth of the land required to build an 18-hole golf course.

Figure 5:
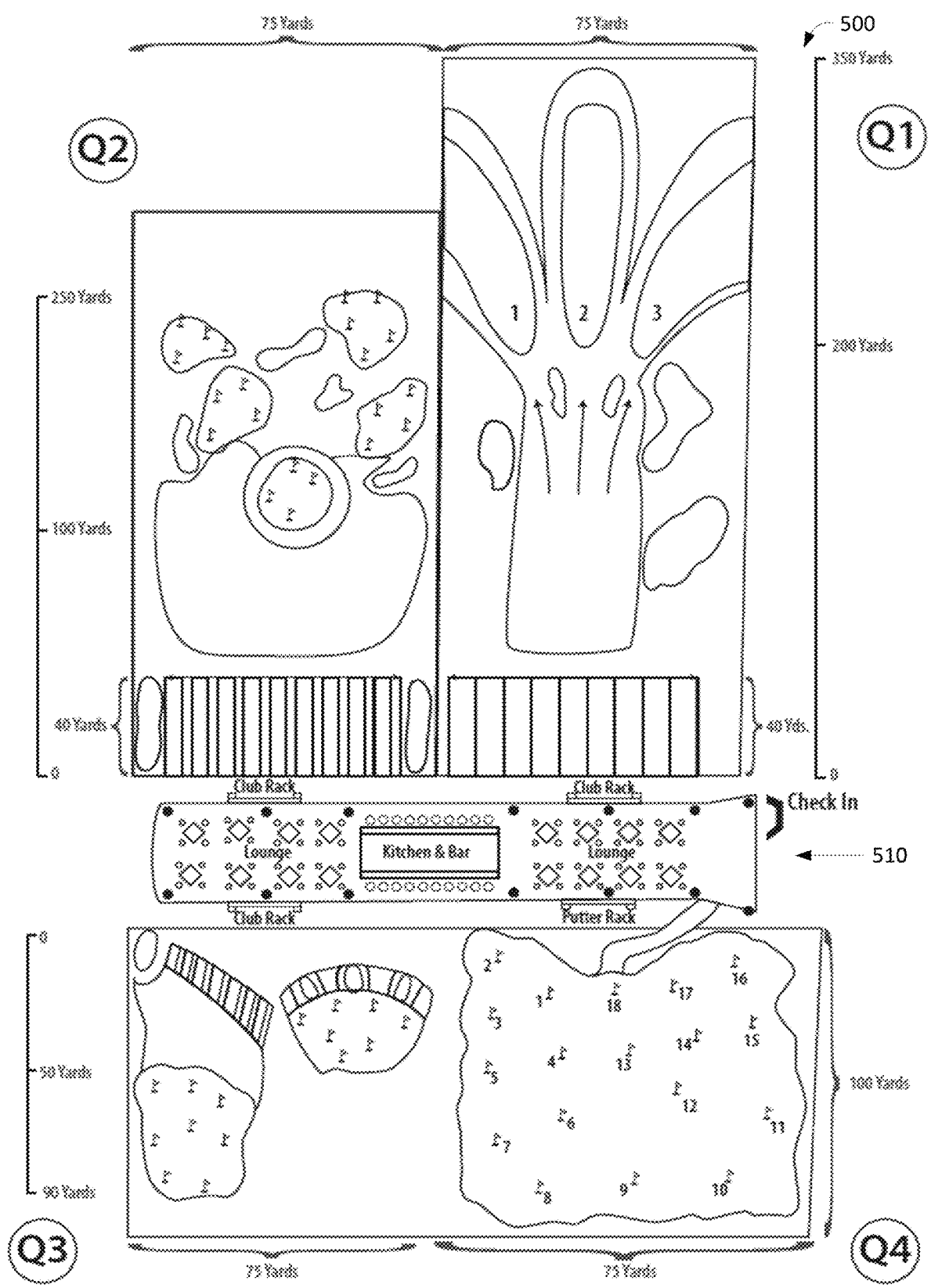

FIG. 5 shows aspects of an example 4-quadrant golf system 500. In some embodiments, the striking areas for the different quadrants (or any number of striking areas) can be centered around an inter-striking area 510. In some embodiments, having the striking areas centered around an inter-striking area, can reduce the amount of travel for players between quadrants. While the example system 500 in FIG. 5 shows food and lounge facilities, in other embodiments, the inter-striking area may be a line or may be a small walkway between striking area.

Generally, any number of striking areas in close proximity and designed for targeting target areas away from the other striking areas can reduce the travel times and may increase player throughput. In some embodiments, this may reduce space (land) requirements for the system.

Figure 10:
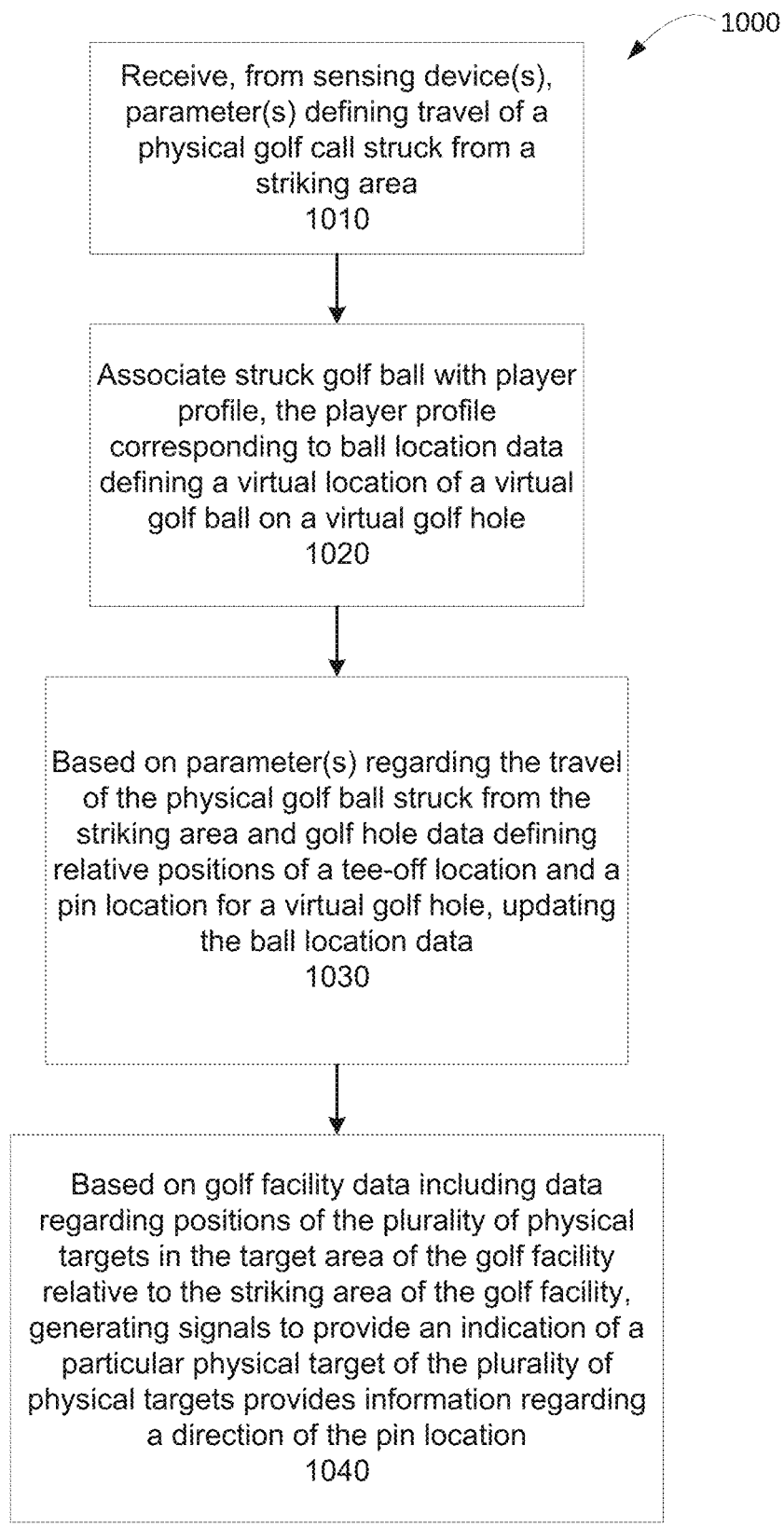
FIG. 10 shows aspects of an example method for operating a golf facility.

FIG. 10 shows aspects of an example method for operating a golf facility as described herein or otherwise.

At 1010, one or more processors in the system receive parameter(s) defining the travel of a physical golf ball struck from a striking area. The parameters can, in some embodiments, be sensed by one or more sensing devices. In some embodiments, the parameters defining the travel of the golf ball can include data regarding ball speed, ball spin, ball angles, club motion parameters, weather parameters and/or any combination of these or other parameters.

In some embodiments, the parameters can be calculated from sensed data. For example, parameters defining a ball's travel (e.g. its trajectory, speed, distance, angle, flight path, relative landing/final position relative to its strike point) can in some embodiments involve calculations to processing video and/or radar data to determine the parameters.

At 1020, the processor(s) associate the parameters defining the ball's travel with a player profile. The player profile includes, is linked to, or otherwise corresponds to ball location data. The ball location data defines a virtual location of the player's virtual golf ball on a virtual golf hole. In some embodiments, the ball location data can include coordinates on a grid or map defining the golf hole/course. In some embodiments, the ball location data can be defined as coordinates relative to a location of the hole of the virtual golf hole. In other embodiments, other data structures for managing an object's location in an area having regions/locations with different characteristics can be used.

In some embodiments, the processor(s) associate a struck ball based on parameters defining a location from which the ball was struck. Based on this location, in some embodiments, the processor(s) associate the struck ball with a device associated with a player profile, or a portion of a striking area at a location within a threshold distance of the location from which the ball was struck. For example, a device associated with the player profile can include a mobile device running an application associating the device with the player profile (e.g. a program installed to access the golf hole, ball travel data and/or next shot indications through which the player has logged into the player's profile). The processor(s) can determine the location of the mobile device via the device's GPS or other location-based service, beacons, near-field communication connection statuses, or any other location detecting mechanism.

In some embodiments, the portion of the striking area (e.g. a stall) can include a scannable tag such as a barcode, RFID, QR code or the like. When a player's device scans the tag, the application on the device can generate a message to the processors to indicate that the player profile associated with the device is to be associated with the next ball struck from the portion of the striking area.

In some embodiments, the scannable tag can be provided by the player's device or a physical tag (e.g. a scannable key fob, printed code, etc.) which the player brings between striking areas and a scanning device at the portion of the striking area can similarly scan the tag and make the association between the next struck ball and the player profile associated with the device.

In some embodiments, the system can be configured to identify the player through capturing of biometric data associated with the player profile (e.g. facial scanning, fingerprint, video tracking/recognition, unique player golf club swing signatures, and/or any other identifiable information or combination thereof).

In some embodiments, the processors provide an indication of which player profile is to strike the next ball from an identified portion of the striking area. For example, a display at the portion of the striking area or on a player device can indicate that the next player to hit the ball from stall 6 is player profile X. Accordingly, the processors associate parameters defining the travel of the next ball struck from stall 6 with player profile X.

In some embodiments, a particular ball struck from the portion of the striking area can be associated with a player profile. For example, a ball can include a tracking mechanism and/or a unique identifier which the golf system can detect and accordingly associate ball travel parameters to the player profile associated with the ball. In some embodiments, the unique identifier can be a colour, number, or other visual identifier which can be captured by one or more sensing devices. In some embodiments, the ball can include an embedded chip or circuit which provides a unique identifier when electronically or otherwise scanned.

At 1030, based on the parameter(s) regarding the travel of the physical ball associated with the player profile, the processor(s) update the ball location data associated with the player profile to define an updated virtual location of the player's virtual golf ball on the golf hole.

In some embodiments, the parameters indicate a distance and direction travelled by the ball. In some embodiments, the processors calculate the distance and direction travelled by the ball from the parameters. Based on the strike location of the physical ball in the striking area and the direction the ball travels relative to an indicated physical target, the processors determine the distance and direction travelled by the player's virtual ball on the virtual hole and update the ball location data.

In some embodiments, the processors associate the strike location of the physical ball with the initial location of the virtual ball, and correlate an indicated physical target in the target area with a direction and distance related to the virtual pin of the virtual golf ball. Using these associations, the processors determine a new location of the virtual ball based on the travel parameters of the physical ball.

In some embodiments, the processors determine a distance and direction the physical ball travels before it hits the ground, and adjusts the virtual ball's distance and direction based on the ground features at the location where ball would have landed in the virtual hole. For example, if the physical ball travels 200 yards in a direction and the virtual hole indicates that 200 yards in that direction is rough or a sand trap, the processors can be configured to reduce the distance the virtual ball travels based on a reduced distance the ball would have travelled after hitting the ground in the virtual hole. Similarly, the processors can adjust for game-defined conditions in the virtual hole such as weather (e.g. wind, rain), ground features (e.g. rough, fairway, green, water, sand, trees, hazards, etc.).

Similarly, in some embodiments, the processors can adjust the virtual ball's distance and direction travelled based on changes in elevation in the virtual golf hole.

At 1040, based on the location of the player's virtual ball and the virtual pin on the virtual golf hole, the processors identify a physical target to provide information for the player's next shot. In some embodiments, the identified physical target is based on golf facility data which includes data regarding the positions of the targets in the target areas of the golf facility.

In some embodiments, providing the indication of the particular physical target includes providing an indication of a striking area from which the player is to strike the ball. In some embodiments, the processors can provide an indication of a physical ground feature from which the player is to strike the ball.

In some embodiments, providing the indication of the particular physical target can additionally or alternatively include display a view of the virtual golf course with the relevant physical target indicators shown in the view. For example, with reference to FIG. 1, a virtual view for a shot to be taken from striking area 110 towards light 130B-1 can show a fairway curving to the left with 3 trees (140F) on the left and 1 tree on the right (130E), and may exclude features such as the water hazard 140E or the fairway curving to the right which may not be relevant to the virtual hole. In some embodiments, this may aid a player in visualizing the virtual hole relative to the physical attributes of the target area 120.

In some embodiments, the identified physical target is selected based on the striking area where the player is already located. For example, in some situations, the processors utilized the striking location for the player as the striking location from where the previous struck ball associated with the player profiles was struck. Based on this, the processors utilize the golf facility data to identify a physical target having a relative distance and direction corresponding to a distance and direction which should be targeted on the virtual hole. In some situations, the physical target may be a flag or hole in the target area indicating an approximate direction and distance of the virtual pin on the virtual hole relative to the player's location. In some situations, the physical target may be a fairway, a distance marker, or any other physical landmark for providing an indication to the player as to the virtual hole characteristics which the player's virtual ball may encounter on its path towards the virtual hole.

In some embodiments, the processors select a striking area and an identified physical target for a player's next shot. For example, the processors may generate signals to instruct the player to move to a different striking area (e.g. a different quadrant) or a different location within a striking area (e.g. a different stall, a different initial putting location) based on the virtual ball location and virtual hole data.

In some embodiments, a striking location for a player's next shot may be selected at least partly based on which striking locations are not currently being used or are scheduled for use by another player.

In some embodiments, a striking location for a player's next shot may be selected based on the locations of the virtual balls of all players playing together. The processors can be configured to select a striking location which has appropriate targets for all players in the party so that the players can stay together.

In some embodiments, a striking location for a player's next shot can be selected based on a tracked history of shots taken from striking locations in the golf system. For example, the processors can be configured to spread out wear-and-tear by selecting suitable striking locations based at least in part on their level of use, for example, the number of shots taken from the location, or condition data for the location (e.g. divots or dead grass as detected by sensing devices or as input data received from devices associated with players and/or maintenance workers).

In some embodiments, the indication can include an indication of a lie of the player's next shot based on the location of the player's virtual ball. In golf facilities having striking areas with different physical ground features, the player can hit from the striking area on a fairway portion, a bunker portion, a rough portion, a tee box, slopes, and/or any other lie.

In some embodiments, the processors can select a striking location based on the lie of the player's virtual ball on the virtual hole.

The processors generate signals to provide an indication of the selected physical target to provide information regarding the direction of the pin location of the virtual hole. In some embodiments, the indication is provided for display on a mobile device associated with the player profile. In some embodiments, the indication is provided for display on one or more display devices in or about the striking area. For example, screens may indicate that player X should be hitting a next shot from stall 2 in quadrant 1 towards fairway Y.

In some embodiments, the signals providing the indication can include illuminating, moving or otherwise visually highlighting a physical target in the target area. For example, a light can be shone on a physical target (or can be illuminated a particular colour associated with the player profile), or a target flag can be waved, etc.

In some embodiments, the processors are configured to keep score for each player profile and/or manage game play. In some embodiments, the processors are configured to coordinate the game play of player profiles across the entire system. In some embodiments, the processors manage the striking areas including portions within each striking area (e.g. stalls, tee boxes) as different players or groups move between them.

In some embodiments, the golf holes can be selected from a menu of golf courses/holes stored in a system database. In some embodiments, the database of golf holes may include representations of holes from real world golf courses. In some embodiments, the processors can generate signals for displaying a user interface presenting a menu enabling players to select the holes and/or courses which they wish to play. In some embodiments, the user interface may allow a player to select any combination of holes. In some embodiments, the user interface can be configured to filter or otherwise present golf hole/course options based on pars, yardage, estimated play times, course designs, skill challenges, and/or any other factor.

In some embodiments, the user interface allows a player to view a virtual reconstruction of the real course holes.

In some embodiments, the system can store course/hole selections, virtual ball locations, stroke counts, and any other historical game play data associated with a player profile. In some instances, this may enable a player to play part of a hole/course, and then resume playing at a latest time while keeping track of the player's ball location at each hole.

In some embodiments, the processors manage virtual ball locations for all player profiles. In some embodiments, a player profile stores, is linked to or is otherwise concurrently associated with multiple virtual ball locations on multiple virtual holes.

During game play, in some embodiments, the processors are configured to direct or otherwise enable a player to take multiple shots for different holes from the same striking area before moving to a different striking area. For example, if a player is starting a new 18-hole golf round at an example golf system such as the one in FIG. 5, the player can take all par-4 and par-5 tee shots in the 18-hole course from striking areas the first quadrant Q1 before moving to take any shots with a shorter distance to the pin in the second quadrant Q2. In some situations, this may reduce the play time from a traditional course by reducing player travel between shots, or the need to change clubs as frequently.

In some embodiments, game play can optionally be played in a traditional manner by hitting all shots for a single hole before moving to the next hole.

When a player or group starts play, the processors can initialize virtual ball locations for each player profile in the group and for each hole in the virtual golf course being played by the player/group to be the tee off position for each virtual hole.

In some embodiments, the processors generate signals for displaying, on a device associated with a player, a user interface including a listing of available shots for the player profile. For example, for a new golf round, the listing can list all eighteen tee-shots for each hole.

In some embodiments, the processors can be configured to provide a listing of available shots which only includes outstanding shots for a particular striking area (e.g. quadrant). For example, in a new golf round in a 4-quadrant system, the processors can be configured to provide a listing of all the outstanding shots in Quadrant 1. Once all shots have updated all virtual ball locations for each hole such that no shots are outstanding/suitable to be taken from quadrant 1, the listing can be updated to show a listing of available shots in a subsequent quadrant.

In some embodiments, the listing can include an identification of which portions (e.g. stalls) of the striking area can be used for each shot. For example, a listing for stroke 1 for hole 1, can list tee boxes A, B, or D of quadrant Q1. In some embodiments, the processors determine which portions of the striking area is suitable for a particular shot based on an identification of the closest matches between the player profile's virtual ball location relative to the locations of a virtual pin and other features (e.g. hazards, fairway shapes, etc.) of the virtual golf hole, and the location of each portion of the striking area and their positional relationships with the physical targets in the target area.

In some embodiments, once the processors associate a player profile with a portion of the striking area as described herein (with respect to associating a struck ball with a player profile) or otherwise, the processors can generate signals to provide an indication of a physical target in the target area to provide information regarding the player's next shot towards the virtual pin location as described herein or otherwise.

In some embodiments, the golf system may allow a player to utilize any available portion of the striking area for their next shot, and once it detects the player is in the portion of the striking area, the system can automatically adjust the identified physical target based on the locational relationship of the utilized portion of the striking area and the physical targets in the target area.

In some embodiments, if multiple shots for different holes are available to be struck from the portion of the striking area, the processors can generate signals for displaying and enabling a selection from a menu listing the available shots and corresponding target indicators for the player profile for that portion of the striking area.

In some situations, by allowing players to move freely to any available portion of a striking area and dynamically updating target indicators, the waiting time between shots can be reduced or eliminated. In some situations, this may improve the player throughput of the system. In some situations, this may enable players to take breaks, socialize, etc. at their leisure without the pressure of another group behind them as may be the case on a traditional golf course.

In some embodiments, the processors can identify specific portions of a striking area from which a player can take their next shot. In some embodiments, the processors manage one or more data structures storing flags or other data fields for indicating a striking area or portion of a striking area is in use. In some embodiments, when the processors select a target and/or striking area for a player profile or at least one player profile in a group, the processors can update the striking area availability data structure to indicate the portion/striking area is in use. The processors can update the striking area availability data structure as to indicate the portion/area is free once the sensing devices detect a ball has been struck, or that player(s) have left the striking area (e.g. through video tracking/proximity sensing).

In some embodiments, the processors can identify suitable stalls or other portions of a striking area for a player profile's next shots based on the striking area availability data.

Due to uneven progress between holes and taking shots at different times, it can be a challenge to determine relative standings between a group of players.

In some embodiments, the processors are configured to track scoring on an individual and/or a group basis. For example, in some embodiments, the processors can project a player profile's final score relative to par based on the virtual ball locations for the player on each virtual hole. In some embodiments, the processors are configured to estimate, for each hole, an estimated number of shots remaining for the player profile based on a distance between the virtual ball location and the virtual pin location.

In some embodiments, the estimated number of shots may account for the lie of the virtual ball on the virtual golf hole (e.g. rough, fairway, sand, etc.) In some embodiments, a difficult lie results in an estimated additional shot.

In some embodiments, the estimated number of shots may account for a player's handicap, or their past performance during the current round, or any other historical range.

In some embodiments, the processors can display a leaderboard for a group. In some examples, a group can be a group of player profiles currently playing together, a number of player profiles currently at the golf facility, or a golf tournament where players can complete their rounds without having to be at the golf facility at the same time.

In some embodiments, the processors at one golf facility can communicate golf round data for a player profile with processors at a second golf facility. In this manner, a player at one location can play and compare scores with a player at a different location. The players could be playing at their respective facilities concurrently or at different times.

In some embodiments, the system can include a database of professional golfer scores and can display a player's score/progress relative to a professional golfer.

In some embodiments, player scores and/or progress on a course can be stored locally on a player's own mobile device interacting with the system.

Figure 11:
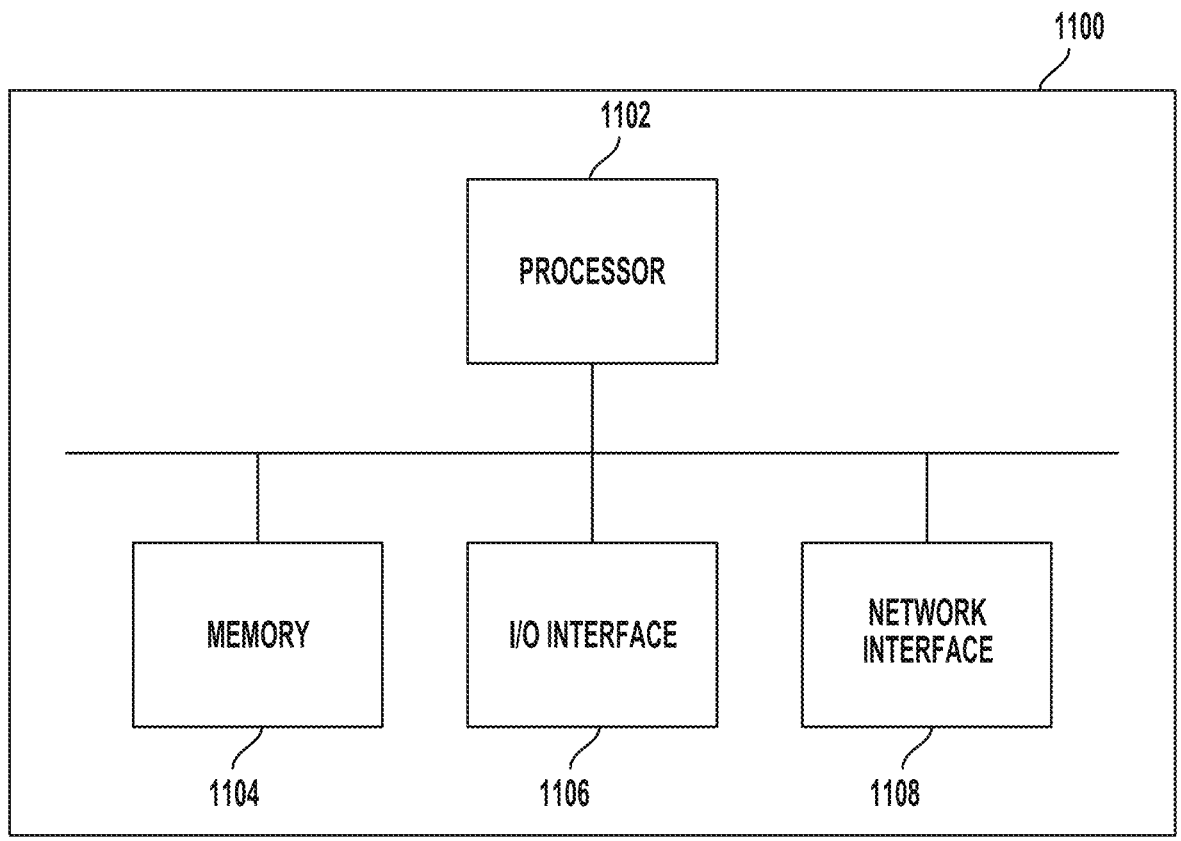
FIG. 11 is a shows electronic devices in an example golf system.

FIG. 11 shows aspects of an example computing system 1100 which can be used to implement one or more of the aspects described herein. The computing system 1100 can include one or more computing devices such as computers, servers, mobile devices, at the like.

As depicted, computing system 1100 includes at least one processor 1102, memory 1104, at least one I/O interface 1106, and at least one network interface 1108.

Each processor 1102 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1104 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1106 enables computing system 1100 to interconnect with one or more input devices, such as a keyboard, mouse, camera, touch screen and a microphone, or with one or more output devices such as a display screen and a speaker. The I/O interfaces can also enable the receipt of data from sensing devices, and/or any other devices for presenting/detecting tags or other identifiers at striking areas, and/or any other devices for determining ball data, player data and/or striking area related data. The I/O interfaces can also enable communication and/or actuation of any target or other related devices in the target areas (e.g. lights, flag actuators, etc.).

In some embodiments, the I/O interfaces can connect to one or more displays or other devices which may be positioned in striking areas or elsewhere to communicate target indicators, scores or other information to players.

In some embodiments, I/O interfaces can be connected via busses, physical connections, or wireless connections (e.g. Bluetooth™).

Each network interface 1108 enables computing system 1100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

In some embodiments, the network interfaces 1108 can be used for connecting to player's individual mobile devices. In some embodiments, players can download software directly to their mobile devices to interact with the system 1100.

Computing system 1100 is operable to register and authenticate users (using a login, unique identifier, and password for example) prior to providing access to applications, a local network, network resources, other networks and network security devices. In some embodiments, a player can log-in to an application on a mobile device to associate that mobile device with the player's player profile. In some embodiments, a player can scan their tag with a mobile device or a computing device in various striking areas to associated the mobile device or computing device with their player profile.

In some embodiments, the computing system 1100 can be provided with an API (application programming interface) so that it can interface with existing sensing devices and/or other computing/mobile devices at a facility.

While the disclosure has been provided and illustrated in connection with specific, presently-preferred embodiments, many variations and modifications may be made without departing from the spirit and scope of the invention(s) disclosed herein. The disclosure and invention(s) are therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the claims is to be defined solely by the appended claims, giving due consideration to the doctrine of equivalents and related doctrines.

What is claimed is:

1. A method for operating a golf facility including a plurality of physical targets in a target area, and a striking area from which golf balls are struck into the target area, the method comprising:

receiving, with at least one processor and from at least one sensing device, one or more parameters defining travel of a physical golf ball struck from the striking area;

associating, by the at least one processor, the parameters defining the travel of the struck golf ball with a player profile, the player profile corresponding to ball location data defining a virtual location of a virtual golf ball on a virtual golf hole;

based on the one or more parameters regarding the travel of the physical golf ball struck from the striking area and golf hole data defining relative positions of a tee-off location and a pin location for a virtual golf hole, updating the ball location data to define an updated virtual location of the virtual golf ball on the virtual golf hole;

based on golf facility data including data regarding positions of the plurality of physical targets in the target area of the golf facility relative to the striking area of the golf facility, generating signals to provide an indication of a particular physical target of the plurality of physical targets provides information regarding a direction of the pin location based on the updated virtual location of the virtual golf ball and the locations of the physical targets relative to the striking area;

concurrently tracking a plurality of virtual ball locations associated with the player profile on a respective plurality of virtual golf holes; and generating signals to provide physical target indications for striking balls for at least two of the plurality of virtual golf holes from a first striking area before generating signals to provide physical target indications for striking balls for at least the two of the plurality of virtual golf holes from a second striking area.

2. The method of claim 1 wherein the one or more parameters received from the at least one sensing device includes at least one of: ball speed, ball angle, or ball spin data.

3. The method of claim 1, wherein associating the struck golf ball with the player profile is based on one or more of the parameters received from the at least one sensing device indicating a location from which the struck golf ball was struck, where the location from which the struck golf ball was struck is corresponds to a device associated with the player profile.

4. The method of claim 1, comprising: based on the golf facility data and the updated virtual location of the virtual golf ball, generating signals to provide an indication of a particular striking area of a plurality of striking areas from which a next golf ball is to be struck.

5. The method of claim 4, comprising: determining which of the plurality of physical targets is used in the indication to provide the information regarding the direction of the pin location based on a locational relationship between the particular striking area and the particular physical target.

6. The method of claim 1, comprising: communicating the ball location data corresponding to the player profile over a communication network for displaying competitive information at a device associated with a second player at a second golf facility, the competitive information for comparing progress of a first player associated with the player profile with progress of the second player.

7. The method of claim 1, comprising: storing, in one or more storage devices, golf shot data based on the one or more parameters received from the at least one sensing device, the golf shot data indicating a number of golf balls struck and respective travelled distances of the golf balls struck; and based on the golf shot data for a plurality of player profiles, generating signals for displaying a comparison of golf game results for the plurality of player profiles.

8. The method of claim 1, wherein the indication of the particular physical target is displayed on a mobile device associated with the player profile.

9. The method of claim 1, comprising: generating signals for displaying a progress score based on a number of shots taken and the virtual ball locations on each of the plurality of virtual golf holes relative to pin locations for each of the plurality of virtual golf holes.

10. A non-transitory, computer-readable medium or media having stored thereon computer-readable instructions which when executed, configure at least one processor for:

receiving, from at least one sensing device, one or more parameters defining travel of a physical golf ball struck from a striking area of a golf facility, the striking area from which golf balls are struck into a target area including a plurality of physical targets;

associating the parameters defining the travel of the struck golf ball with a player profile, the player profile corresponding to ball location data defining a virtual location of a virtual golf ball on a virtual golf hole;

based on the one or more parameters regarding the travel of the physical golf ball struck from the striking area and golf hole data defining relative positions of a tee-off location and a pin location for a virtual golf hole, updating the ball location data to define an updated virtual location of the virtual golf ball on the virtual golf hole;

based on golf facility data including data regarding positions of the plurality of physical targets in the target area of the golf facility relative to the striking area of the golf facility, generating signals to provide an indication of a particular physical target of the plurality of physical targets provides information regarding a direction of the pin location based on the updated virtual location of the virtual golf ball and the locations of the physical targets relative to the striking area;

concurrently tracking a plurality of virtual ball locations associated with the player profile on a respective plurality of virtual golf holes; and generating signals to provide physical target indications for striking balls for at least two of the plurality of virtual golf holes from a first striking area before generating signals to provide physical target indications for striking balls for at least the two of the plurality of virtual golf holes from a second striking area.

* * * * *